US012761436B2

(12) United States Patent
Nair et al.

(10) Patent No.: US 12,761,436 B2
(45) **Date of Patent: *Oct. 13, 2026**

(54) FIBER DISTRIBUTION HUBS

(71) Applicant: OPTERNA AM, INC., East Syracuse, NY (US)

(72) Inventors: K.R. Suresh Nair, Cochin (IN); Kizhakkekuttu Parameswaran Chandran, Cochin (IN); Mathew Anjilimoottil Thomas, Cochin (IN); Biji Mathew Arakkakudy, Cochin (IN); Binoy J. Puthussery, Cochin (IN); E.K. Kiran Kumar, Cochin (IN); Beevi M. Mohammedali, Cochin (IN); P.V. Ashwin, Cochin (IN); Benoy Sarasan, Cochin (IN); Randy Reagan, Morristown, NJ (US)

(73) Assignee: OPTERNA AM, INC., East Syracuse, NY (US)

( * ) Notice: Subject to any disclaimer, the term of this patent is extended or adjusted under 35 U.S.C. 154(b) by 949 days.

This patent is subject to a terminal disclaimer.

(21) Appl. No.: 17/978,843

(22) Filed: Nov. 1, 2022

(65) Prior Publication Data

US 2023/0048588 A1 Feb. 16, 2023

Related U.S. Application Data

(63) Continuation of application No. 16/878,476, filed on May 19, 2020, now Pat. No. 11,487,070, which is a (Continued)

(51) Int. Cl.
*G02B 6/44* (2006.01)

(52) U.S. Cl.
CPC ..... *G02B 6/44465* (2023.05); *G02B 6/44526* (2023.05); *G02B 6/44528* (2023.05); *G02B 6/4454* (2013.01)

(58) Field of Classification Search
CPC ............ G02B 6/44465; G02B 6/44526; G02B 6/44528; G02B 6/4454
See application file for complete search history.

(56) References Cited

U.S. PATENT DOCUMENTS 11,487,070 B2 * 11/2022 Nair .................. G02B 6/44528
2009/0022467 A1 1/2009 Puetz et al.
(Continued)

FOREIGN PATENT DOCUMENTS

WO 2011003010 A2 1/2011

OTHER PUBLICATIONS

Search Report dated Sep. 14, 2012 in corresponding International Application No. PCT/US2012/023509, 6 pages.
(Continued)

*Primary Examiner* — Uyen Chau N Le
*Assistant Examiner* — Hoang Q Tran
(74) *Attorney, Agent, or Firm* — MH2 Technology Law Group LLP

(57) ABSTRACT

A fiber distribution hub includes an enclosure defining an interior region and a frame body having a longitudinal axis. The frame body is rotatably mounted within the interior region of the enclosure such that the frame body can rotate about the longitudinal axis relative to the enclosure between a first terminal angular position and a second terminal angular position. The frame body is rotatably mounted within the interior region of the enclosure also such that the entire frame body remains within the interior region as the frame body rotates between the first terminal angular position and the second terminal angular position. The fiber distribution hub also includes a splitter coupled to the frame body and having a splitter input and a splitter output.

32 Claims, 12 Drawing Sheets

Related U.S. Application Data continuation of application No. 15/151,752, filed on May 11, 2016, now Pat. No. 10,656,357, which is a continuation of application No. 13/982,773, filed as application No. PCT/US2012/023509 on Feb. 1, 2012, now Pat. No. 9,354,415.

(60) Provisional application No. 61/438,290, filed on Feb. 1, 2011.

(56) References Cited

U.S. PATENT DOCUMENTS

| | | | | |
|---|---|---|---|---|
| 2009/0060441 | A1* | 3/2009 | Kowalczyk | G02B 6/4457 385/135 |
| 2009/0074370 | A1 | 3/2009 | Kowalczyk et al. | |
| 2009/0103879 | A1* | 4/2009 | Tang | G02B 6/44526 385/135 |
| 2009/0110359 | A1 | 4/2009 | Smith et al. | |
| 2009/0294016 | A1 | 12/2009 | Sayres et al. | |
| 2010/0183276 | A1 | 7/2010 | Smith | |
| 2011/0075968 | A1 | 3/2011 | Cao et al. | |
| 2011/0311226 | A1 | 12/2011 | Smith et al. | |

OTHER PUBLICATIONS

Written Opinion dated Sep. 14, 2012 in corresponding International Application No. PCT/US2012/023509, 8 pages.

International Preliminary Report on Patentability dated Aug. 6, 2013 in corresponding International Application No. PCT/US2012/023509, 9 pages.

* cited by examiner

FIBER DISTRIBUTION HUBS

CROSS REFERENCE TO RELATED APPLICATIONS

This is a continuation of U.S. Nonprovisional application Ser. No. 16/878,476 filed on May 19, 2020, which is continuation of U.S. Nonprovisional Application Ser. No. 15/151,752, filed on May 11, 2016, now U.S. Pat. No. 10,656,357, which is a continuation of U.S. Nonprovisional application Ser. No. 13/982,773, filed on Oct. 15, 2013, now U.S. Pat. No. 9,354,415, which is a U.S. National Stage of International Application No. PCT/US2012/023509, filed Feb. 1, 2012, which claims the benefit of U.S. Provisional Application No. 61/438,290, filed Feb. 1, 2011. Each of these applications is incorporated by reference herein.

BACKGROUND

Field

The present invention relates to fiber optic distribution systems and particularly to fiber distribution hubs used in fiber optic distribution systems.

Background

One type of fiber optic distribution system is a point-to-multipoint system. In point-to-multipoint systems, a single optical fiber from a service provider's central office services multiple optical network units at the end-user locations, for example, residences, apartments, or businesses. For example, a single optical fiber can service one hundred and twenty-eight end users. Optical components such as switches and routers in active optical networks, unpowered optical splitters in passive optical networks (PONs), and fiber optic cables distribute the optical signals between the service provider's location and the end users. Fiber distribution hubs (FDHs) house these optical components.

Because each feeder fiber from a service provider's central office can be optically coupled to hundreds of outgoing distribution fibers, FDHs often have a high density of fiber optic cables and a large quantity of optical components to distribute the signal from the optical signal from the feeder cable to the fibers of the distribution cable. For example, in a PON, an FDH may include several splicing cassettes that optically couple a feeder cable with optical splitters; multiple splitters; and multiple adapters for optically coupling the splitters to the distribution cable.

Accordingly, there is a need for an FDH that arranges these optical components and fiber optic cables in a manner that the degradation of the transmitted optical signals is minimized. There is also a need for an HMI that provides easy access to all of the enclosed optical components and fiber optic cables to allow for replacement or maintenance.

BRIEF SUMMARY

A fiber distribution hub can interface a service provider location and one or more access terminals in a fiber distribution system. A fiber distribution hub can include an enclosure defining an interior region and a frame body having a longitudinal axis. The frame body is rotatably mounted within the interior region of the enclosure such that the frame body can rotate about the longitudinal axis relative to the enclosure. The fiber distribution hub can also include a plurality of splitter modules coupled to the frame body.

Each splitter module can have at least one splitter input and at least two splitter outputs. The fiber distribution hub can have a first plurality of adapters coupled to the frame body that are configured to optically couple to splitter output cables. The fiber distribution hub can also include a storage retaining structure coupled to the frame body. The storage retaining structure can be configured to selectively secure connectorized ends of splitter output cables.

Figure 1:
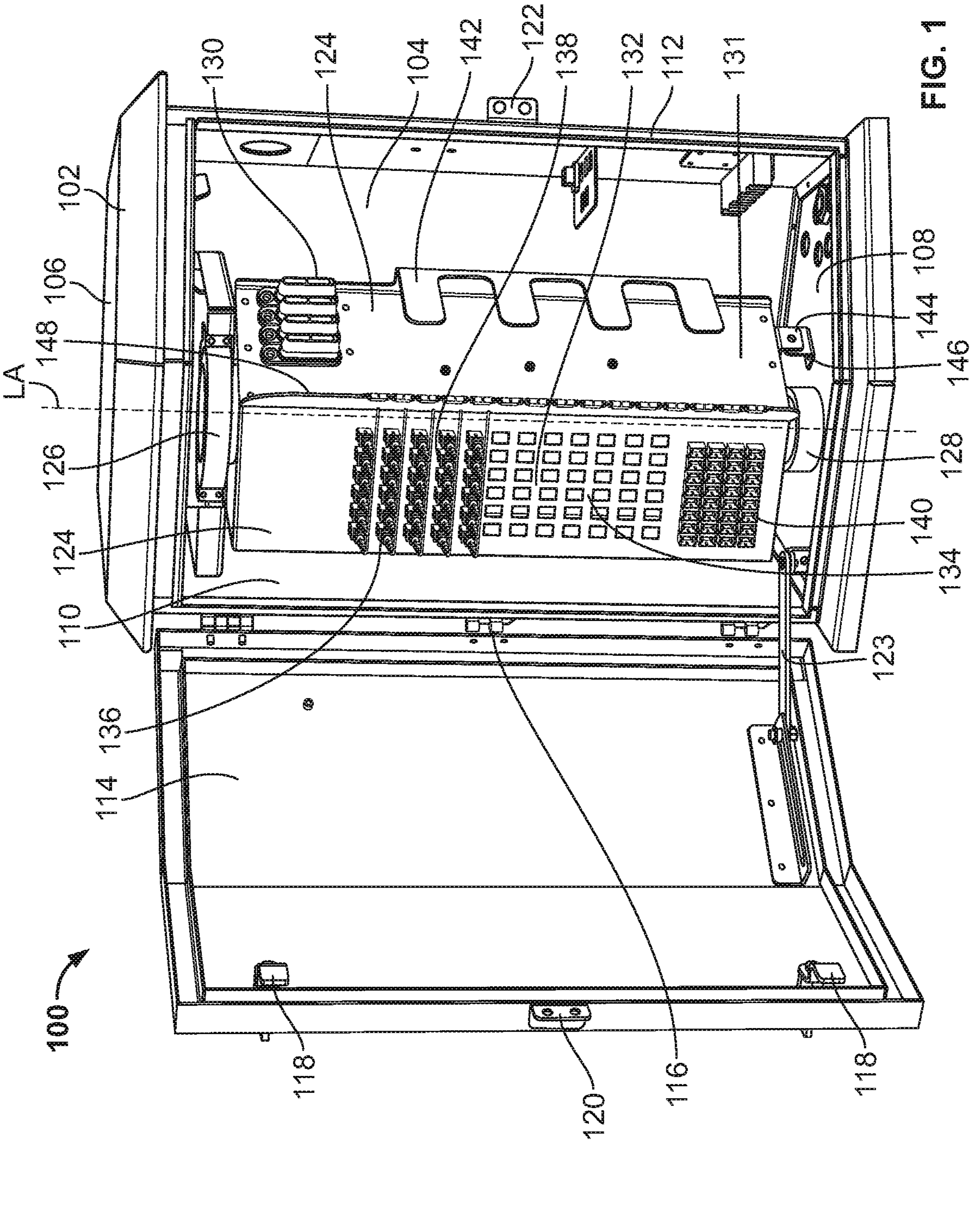
FIG. 1 is a perspective view of a fiber distribution hub.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The embodiment(s) described, and references in the specification to "one embodiment". "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 13:
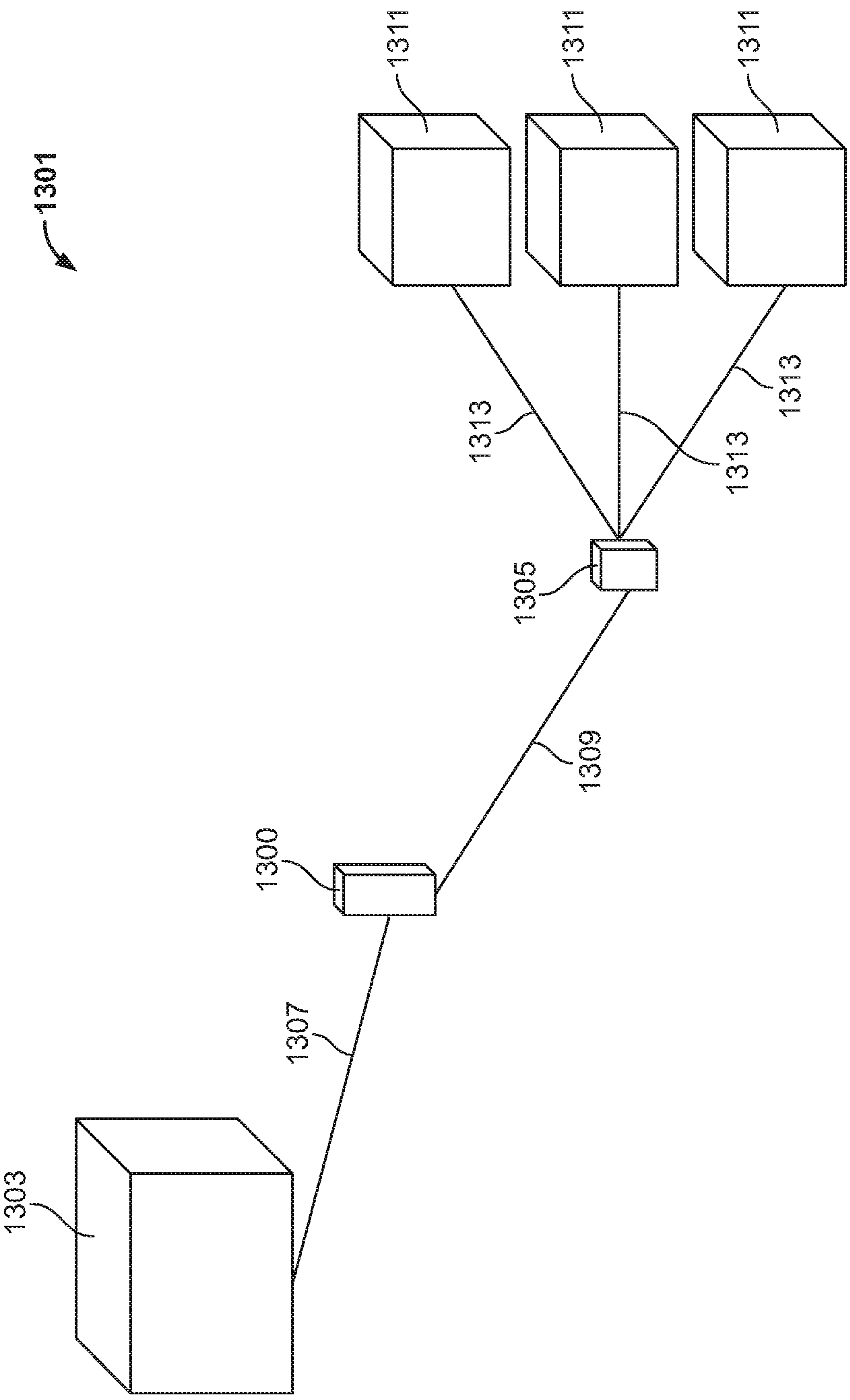
FIG. 13 is a schematic illustration of a fiber distribution system using a fiber distribution hub.

FIG. 13 schematically illustrates a fiber optic distribution system 1301. As shown in FIG. 13, fiber optic distribution system 1301 can include a service provider location 1303 and one or more access terminals 1305. Service provider location 1303 may be a service provider central office or a local service provider supply location. A fiber distribution hub (FDH) 1300 optically couples service provider location 1303 to access terminal 1305. FDH 1300 can receive one or more multi-fiber feeder cables 1307 from service provider location 1303. FDH 1300 provides optical signals to end users 1311 by one or more distribution cables 1309 that interface access terminal 1305. End users 1311 receive the optical signals from access terminal 1305 through one or more drop cables 1313. A person skilled in the relevant art would understand FDH 1300 can be used in fiber optic distribution systems that vary from the one illustrated in FIG. 13. For example, FDHs can be used in high fiber density applications such as data centers.

FIGS. 1-5 illustrate an FDH 100. FDH 100 is configured to split one or more optical signals from a feeder cable (not shown in FIGS. 1-5) into a plurality of optical signals for distribution to one or more end users through one or more distribution cables (not shown in FIGS. 1-5). In some embodiments, a number of subscribers may be routed to FDH 100 for connection to optical splitters housed therein. The splitters split the optical signal in feeder fibers into a plurality of signals for distribution to the end users through a multi-fiber distribution cable.

Figure 2:
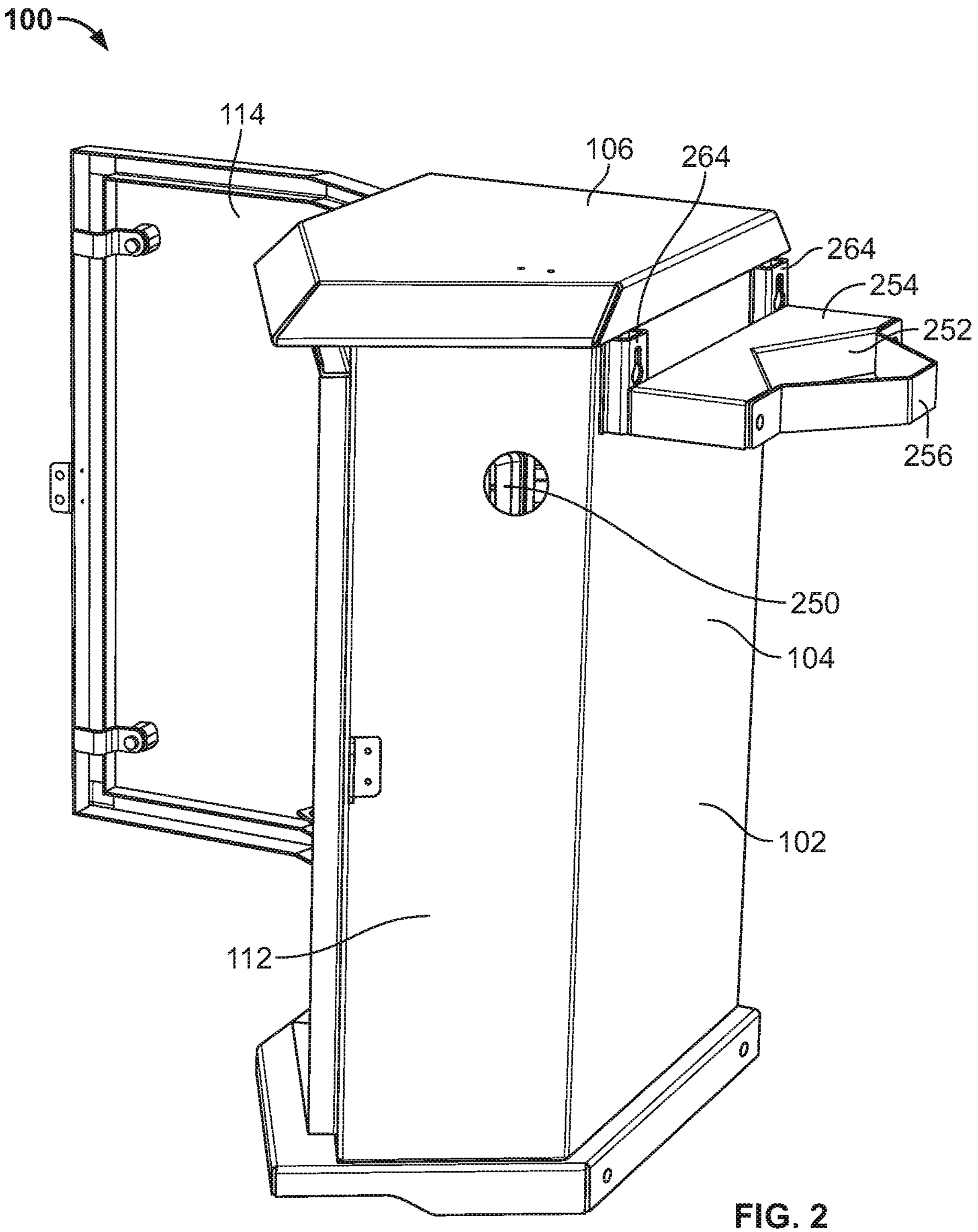
FIG. 2 is another perspective view of the fiber distribution hub shown in FIG. 1.
Figure 3:
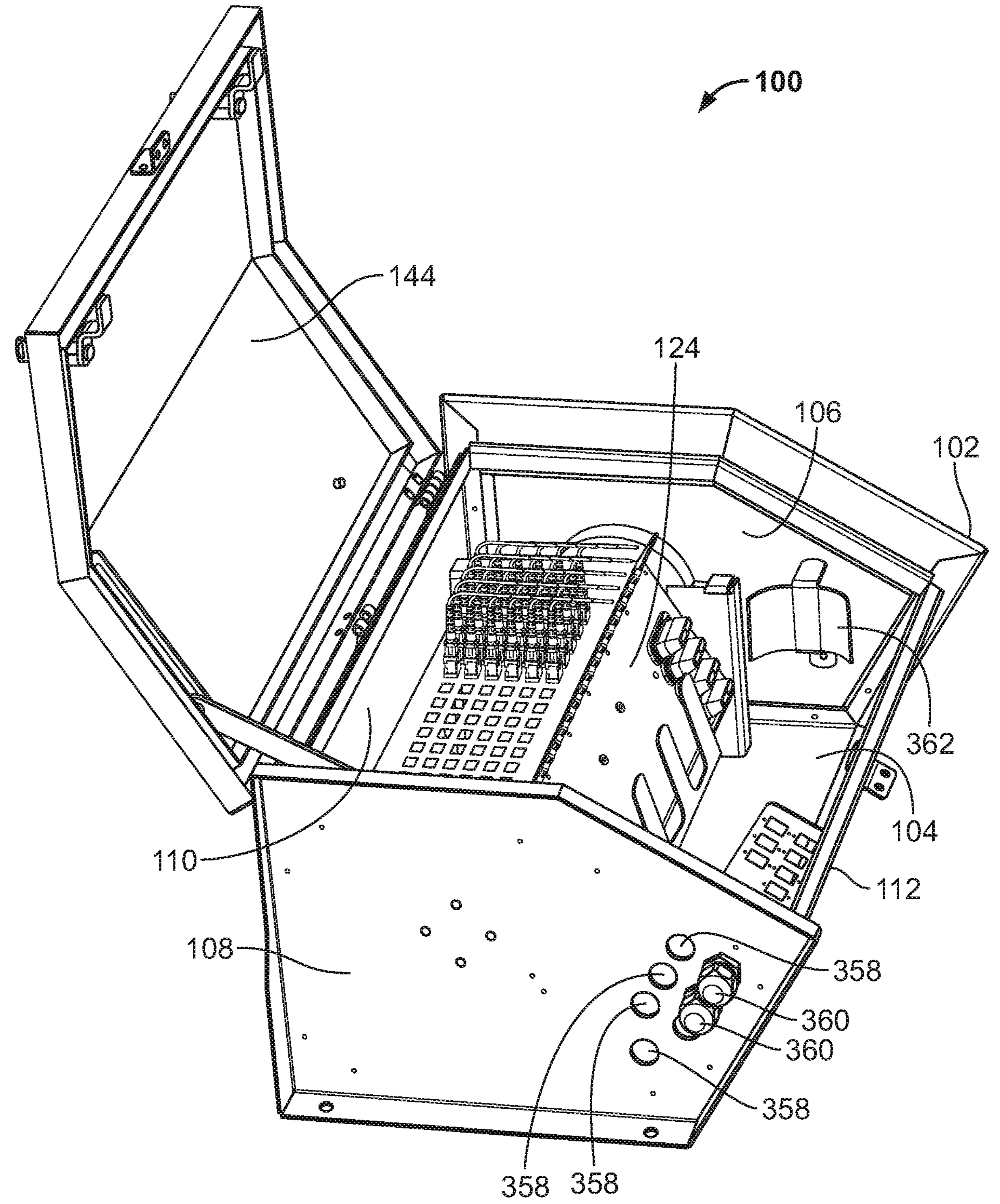
FIG. 3 is yet another perspective view of the fiber distribution hub shown in FIG. 1.

FIGS. 1-3 are perspective views of FDH 100. FDH 100 includes an enclosure 102. Enclosure 102 defines an interior region. Enclosure 102 can include a first panel 104, a pair of opposing panels 106 and 108 extending from first panel 104, and a second pair of opposing panels 110 and 112 extending from first panel 104. Panel 110 is between opposing panels 106 and 108, and panel 112 is between opposing panels 106 and 108. Panels 106, 108, 110, and 112 collectively define an opening to the interior region of enclosure 102.

Enclosure 102 can also include panel 114 that is configured to be selectively movable between a first position (not shown) that closes the interior region opening defined by panels 106, 108, 110, and 112 to a second position (as shown in FIGS. 1-3) that provides access to the interior region of enclosure 102. Panel 114 can be movably coupled to panel 110 by one or more hinges 116. Panel 114 can have one or more locking mechanisms that prevents panel 114 from moving away from the first position that closes the interior region opening and prevents access. For example, panel 114 can have two latches 118 on first and second ends of panel 114 that selectively engage panel 112. Engagement between latches 118 and panel 112 prevents panel 114 from opening. Panel 114 can also include a locking plate 120 extending from an edge of panel 114, and panel 112 can include a corresponding locking plate 122. When panel 114 is in the first closed position, a hole defined by locking plate 120 aligns with a hole defined by locking plate 122. A pad lock or any other suitable locking device can pass through the aligned holes defined by locking plates 120 and 122, which prevents panel 114 from opening.

Enclosure 102 can also include a rotational restraint that prevents panel 114 from rotating past a certain position. As shown in FIG. 1, the rotational restraint can be an arm 123 rotatably connected to panel 108 and slidably coupled to a bracket on panel 114. As panel 114 rotates away from the closed first position, arm 123 rotates relative to panel 108 and slides relative to the bracket on panel 114 until arm 123 contacts a surface of the bracket, which prevents further rotation of panel 114.

Enclosure 102 can provide environmental protection for any components housed within the interior region. In some embodiments, enclosure 102 can create an environmental seal that prevents dust or other contaminants from entering the interior region when panel 114 is in the closed first position.

Enclosure 102 can also prevent external forces from being applied to any components housed within the interior region of enclosure 102. Enclosure 102 can be made of any suitable rigid or semi-rigid material, for example, metal (such as aluminum), plastic, or any other suitable material for protecting the internal components of enclosure 102.

Enclosure 102 can form any suitable shape for containing optical components. For example, enclosure 102 can form a pentagonal prism as shown in FIGS. 1-3. Panel 104 and panel 106 can be congruent pentagons, and panels 108, 110, and 112 can extend between panels 104 and 106. In other embodiments, enclosure 102 forms other suitable three-dimensional shapes, for example, square or rectangular prisms, a cylinder, or any other suitable three-dimensional curvilinear shape.

FDH 100 can be configured to be coupled to one or more multi-fiber feeder cables (not shown) and to one or more multi-fiber distribution cables (not shown). Accordingly, enclosure 102 can define one or more openings for passing the one or more multi-fiber feeder cables and the one or more multi-fiber distribution cables. As shown in FIG. 2, panel 112 of enclosure 102 can define an opening 250 for ventilation. As shown in FIG. 3, panel 108 defines one or more openings 358 for passing the feeder or distribution cables. FDH 100 can also include one or more fittings 360 coupled to openings 358. Fittings 360 can be configured to secure the fiber optic cables passing through the respective opening 358 to enclosure 102. In other embodiments not shown, panel 106 can define one or more openings for passing the feeder or distribution cables.

Enclosure 102 can also include one or more cable routing guides configured to route fiber optic cables within enclosure 102. For example, enclosure 102 can include a cable routing guide 362 on an inner surface of panel 106 as shown in FIG. 3. Cable routing guide 362 can be configured to route fiber optic cables passing through openings 358.

FDH 100 can be configured to be mounted to a pedestal base or to a pole. As shown in FIG. 2, FDH 100 can include a pole mounting bracket 252. Bracket 252 can be selectively coupled to enclosure 102 using a pair of brackets 264 having slots configured to receive retaining pins on bracket 252. Bracket 252 includes a base 254 and a band 256. Collectively, base 254 and band 256 define an opening for receiving a pole upon which FDH 100 can be mounted. Band 254 can be selectively coupled to base 254 using any suitable fastener, for example, bolts, screws, or any other suitable fastener.

Frame body 124 is rotatably coupled to enclosure 102. Frame body 124 has a longitudinal axis LA about which frame body 124 can rotate. Longitudinal axis LA can be perpendicular to panel 108. In some embodiments, longitudinal axis LA is also perpendicular to a mounting surface, for example, the ground or floor, upon which FDH 100 is mounted. In some embodiments, frame body 124 is configured to rotate such that entire frame body 124 remains within the interior region of enclosure 102 throughout the entire angular displacement of frame body 124. Frame body 124 can rotate when optical components mounted thereon are coupled to the one or more distribution cables and the one or more feeder cables.

Frame body 124 can be configured to rotate about longitudinal axis LA in both directions, for example, clockwise and counterclockwise when viewed from panel 106. Frame body 124 can be coupled to enclosure 102 using a pair of bearing mounts 126 and 128 axially aligned with longitudinal axis LA as shown in FIG. 1. Bearing mounts 126 and 128 can be plain bearings, roller-element bearings (for example, ball bearings or roller bearings), or any other suitable bearings. In some embodiments, one bearing mount may be a plain bearing and the other bearing mount may be a roller-element bearing. In embodiments in which bearings 126 or 128 are plain bearings, the plain bearings may use one or more bushings.

Frame body 124 can be configured to house one or more splitters 130. As shown in FIG. 1, frame body 124 includes a splitter panel 131. Optical splitters 130 are configured to be selectively coupled to splitter panel 131. For example, splitter panel 131 can define one or more openings sized to closely receive optical splitters 130. Optical splitters 130 can include one or more locking mechanism for securing optical splitters 130 to splitter panel 131.

One or more multi-fiber feeder cables (not shown) enter enclosure 102 through openings 358. Each feeder cable can include, for example, 12, 24, 48, 72, or any other suitable quantity of fibers. Each feeder cable is then split into single-fiber feeder cables using a break-out device and routed to optical splitters 130 (after splicing cassettes described in more detail below with reference to FIGS. 4 and 5). In some embodiments, splitters 130 can have a 1 input×32 output configuration, a 1 input×16 output configuration, or any other suitable splitter configuration. As shown in FIG. 1, frame body 124 can house four splitters 130. In other embodiments, frame body 124 can be configured to house more or less than four splitters 130.

Frame body 124 can also be configured to house a plurality of adapters 136 that are configured to optically couple splitter output cables 138 to connectorized ends of one or more distribution cables (not shown in FIGS. 1-5). As shown in FIG. 1, frame body 124 can include an adapter panel 132 that defines a plurality of openings 134. Each opening 134 is sized to securely receive adapters 136. Adapter panel 132 can define a 6×12 array of openings 134. In other embodiments, adapter panel 132 can define any other suitable configuration of openings 134 with more or less than 72 openings.

Additionally, frame body 124 can include one or more storage retaining structures 140. Each retaining structure 140 is configured to selectively couple with the ends of splitter output cables 138 when the splitter output cables 138 are not connected to adapters 136. In some embodiments, each retaining structure 140 includes adapters configured to selectively couple to the connectorized ends of splitter output cables 138. In other embodiments, storage retaining structures 140 include clips or any other suitable retaining structures that can selectively couple to unused splitter output cables 138.

Frame body 124 can further include one or more cable routing guides or cable management structures. For example, as shown in FIG. 1, splitter panel 131 can include cable management structure 142. Cable management structure 142 extends from an edge of panel 131 and curves towards the center of panel 131. Cable management structure 142 helps ensure that fiber optic cables routed to and around frame body 124 turn in unison with frame body 124.

Frame body 124 can be configured to rotate in the first direction from a first position (not shown) to a second position (as shown in FIG. 1) at which frame body 124 cannot rotate further in the first direction. In some embodiments, adapter panel 132 is radially aligned with the center of the interior region opening. In some embodiments as shown in FIGS. 1-5, FDH 100 includes a pair of corresponding tabs on enclosure 102 and frame body 124 that contact each at the second position preventing any further rotation in the first direction. As shown in FIG. 1, frame body 124 can include a tab 144 that extends from a surface of frame body 124, and enclosure 102 can include a tab 146 that extends from an inner surface of panel 108 of enclosure 102. Tabs 144 and 146 are positioned such that when frame body 124 is at the second position, tab 144 contacts tab 146 to prevent any further rotation of frame body 124 in the first direction. Tab 144 can define a hole that is aligned with a hole defined by tab 146 when frame body 124 is at the second position. A locking device, for example, a pad lock, clip, or tie, can pass through the aligned holes of tabs 144 and 146 to prevent rotation of frame body 124.

Frame body 124 can also be configured to rotate in a second direction opposite from the first direction such that frame body 124 rotates from the first position to a third position at which frame body 124 cannot rotate any further in the second direction. In some embodiments, the second position and the third position are about 360 degrees apart from each other. In other embodiments, the second position and the third position are less than about 360 degrees apart, for example, 270 degrees, 180 degrees, or any other suitable amount. In such embodiments, enclosure 102 can include a second tab (not shown) that is positioned to contact tab 144 of frame body 124 at the third position, preventing further rotation. Accordingly, a user can selectively rotate frame body 124 between the third position and the second position. During rotation, the optical components of FDH 100 can remain optically coupled to the distribution cables and the feeder cables.

Figure 4:
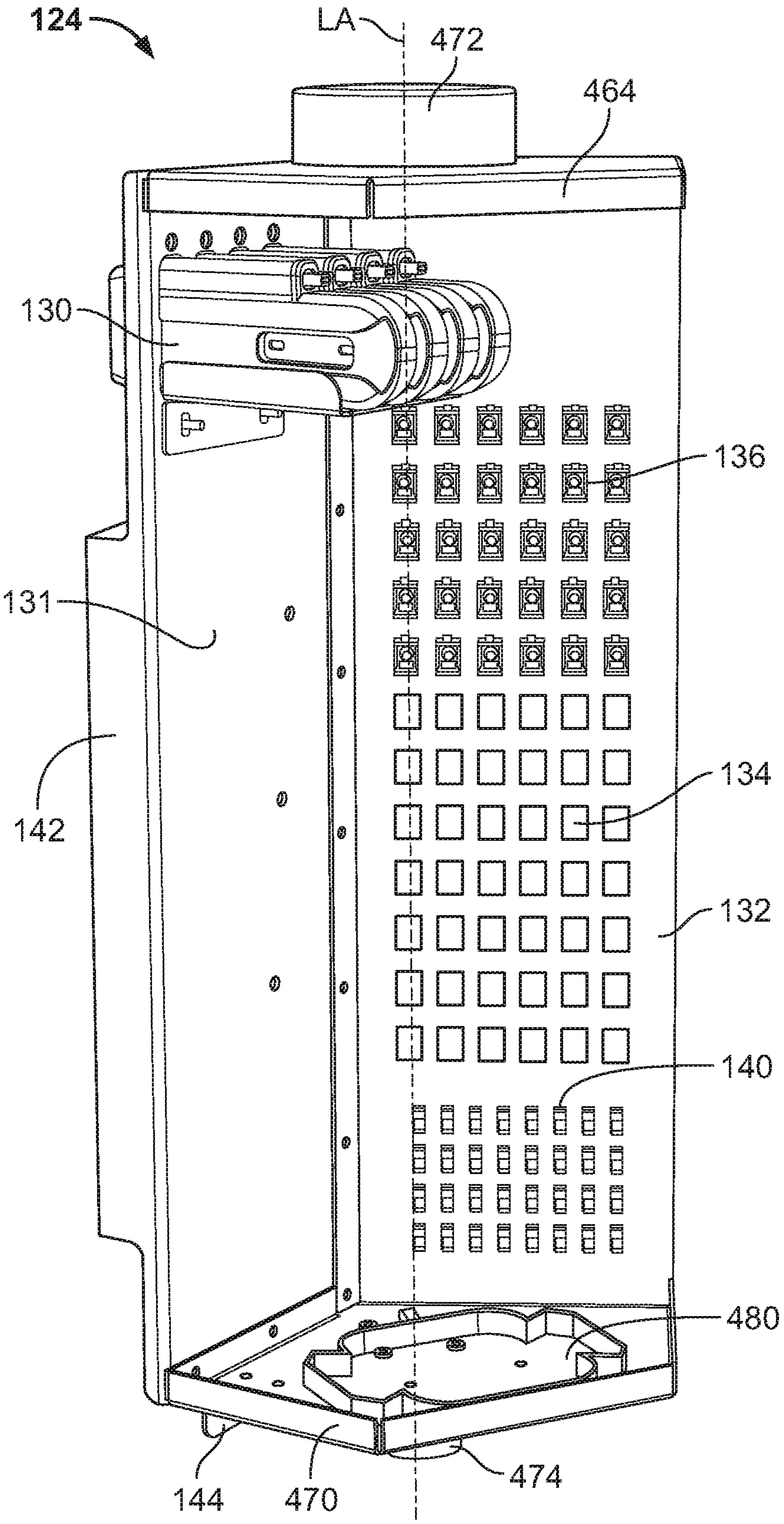
FIG. 4 is a perspective view of the frame body removed from the enclosure shown in fiber distribution hub of FIG. 1.
Figure 5:
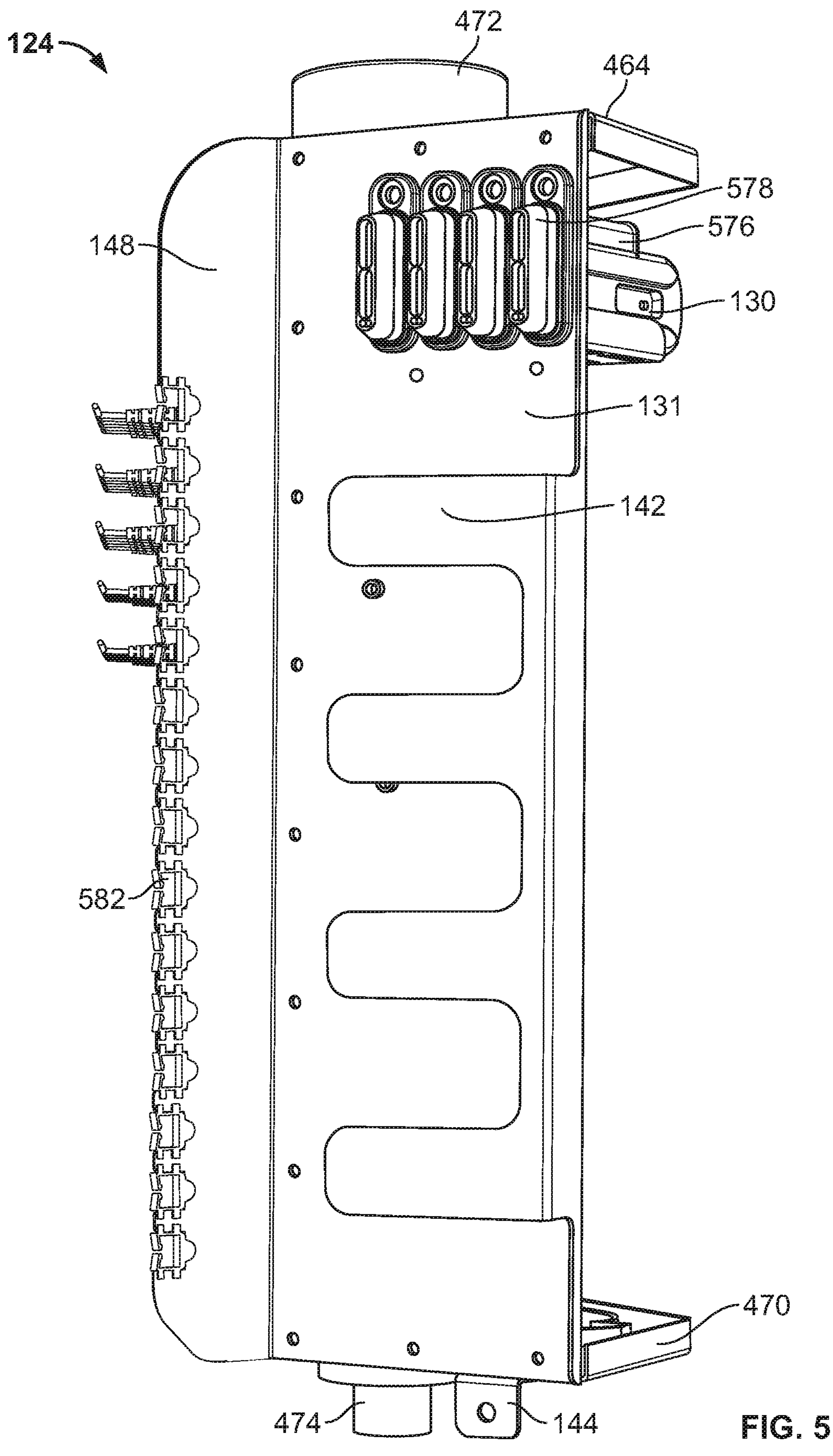
FIG. 5 is a plan view of the frame body shown in FIG. 4.

FIGS. 4 and 5 illustrate frame body 124 removed from enclosure 102. As shown in FIG. 4, frame body 124 can include a first end panel 464 that joins splitter panel 131 and adapter panel 132. End panel 464 can be perpendicular to both splitter panel 131 and adapter panel 132. Frame body 124 can also include a second end panel 470 that joins splitter panel 131 and adapter panel 132 on an end opposite from first end panel 464. Panel 464 can be perpendicular to both splitter panel 131 and adapter panel 132.

A boss 472 can extend from an outer surface of first end panel 464. Boss 472 forms, in part, bearing mount 126 of FDH 100. A boss 474 can extend from an outer surface of second end panel 470. Boss 474 forms, in part, bearing mount 128 of FDH 100. Boss 472 and boss 474 can be axially aligned along longitudinal axis LA.

End panel 470 can be configured to house one or more splicing cassettes (not shown in FIG. 4). The splicing cassettes are configured to optically couple fibers of one or more distribution cables with single fibers of splitter input cables of splitters 130. For example, a splice cassette tray 480 can be coupled to an inner surface of end panel 470. Splice cassette tray 480 can be shaped to closely receive the one or more splicing cassettes. Accordingly, when frame body 124 rotates, splicing cassettes mounted on end panel 470 rotate in unison with frame body 124.

FIG. 5 illustrates a side view of frame body 124. Frame body 124 can further include a dividing panel 148 that extends from the intersecting joint of splitter panel 131 and adapter panel 132. Dividing panel 148 defines one or more slots 582. Slots 582 are configured to align splitter output cables 138 from optical splitters 130 with the desired adapters 136 or retaining structures 140.

As best seen in FIG. 5, each optical splitter 130 has an input 576 and multiple outputs 578. A single-fiber splitter input cable is optically coupled to input 576, and a plurality of single-fiber splitter output cables are optically coupled to splitter outputs 578. Splitter input cables are routed from the one or more splice cassettes mounted on end panel 470 to the inputs 576 of optical splitters 130. Splitter output cables are routed from outputs 578 of splitters 130 through the desired slot 582 in dividing panel 148 to adapters 136 or storage retaining structures 140.

Frame body 124 can be configured such that in the third position a user has access to end panel 470 (and any optical components mounted thereon, for example, one or more splicing cassettes) and inputs 576 of splitters 130 through the interior region opening. Accordingly, FDH 100 can provide access to end panel 470 and any components mounted thereon (for example, one or more splicing cassettes), inputs 576 of splitters 130, outputs 578 of optical splitters 130, adapters 136, and storage retaining structures 140 through a selective rotation of frame body 124. Accordingly, rotation of frame body 124 provides easy access to any component of FDH 100 for repair or replacement. In some embodiments, frame body 124 can rotate about longitudinal axis LA about 180 degrees in one direction and about 180 degrees in the other direction from the first position. In other embodiments, frame body 124 can rotate more or less than 180 degrees in either direction from the first position.

Although not shown in FIGS. 1-5, frame body 124 can include one or more handles (not shown) that enable a user of FDH 100 to easily rotate frame body 124.

FIGS. 6A, 6B, 7, 8, 9A-9C, and 10-12 illustrate an FDH 600 according to another embodiment. Elements of FDH 600 that are identical, functionally similar, and/or structurally similar to elements of FDH 100 are identified with reference numbers that have the same last two digits as the reference numbers used above with regard to FDH 100 shown in FIGS. 1-5.

Figure 6B:
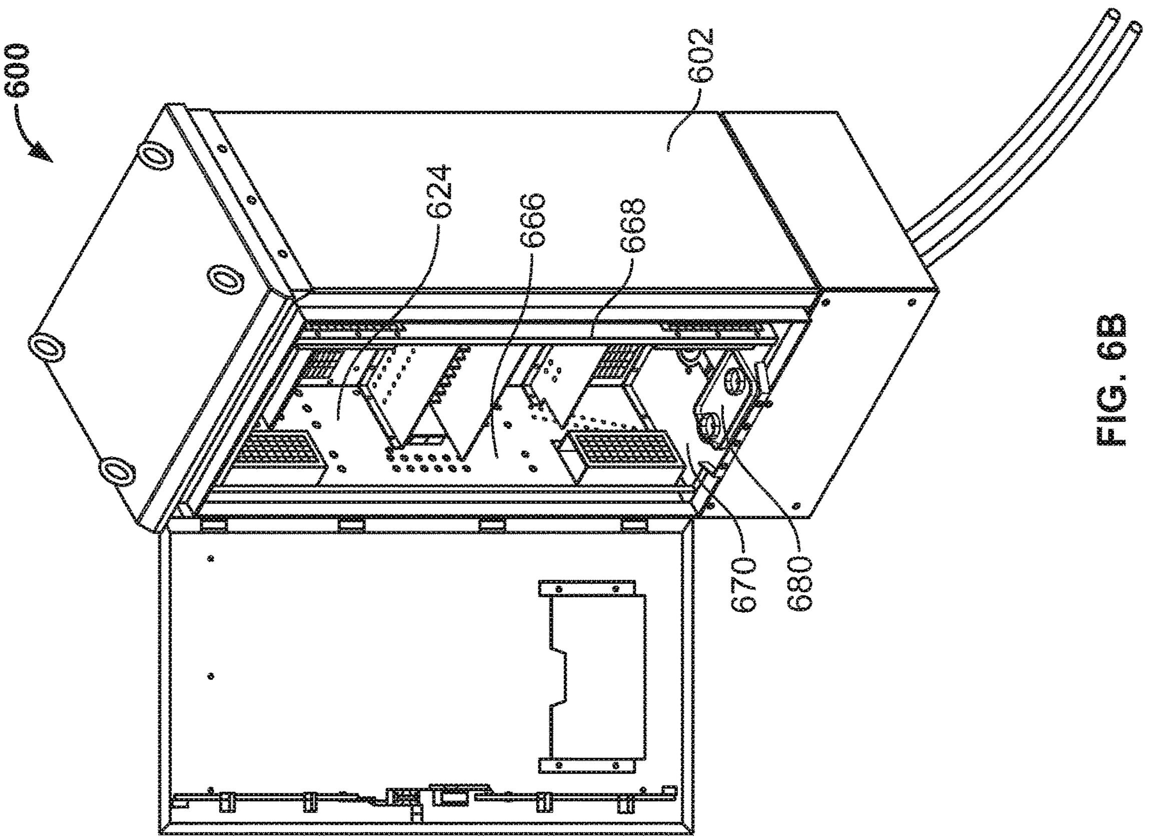
FIGS. 6A and 6B are perspective views of another fiber distribution hub with the frame body in a first position and the frame body in a second position, respectively.
Figure 6A:
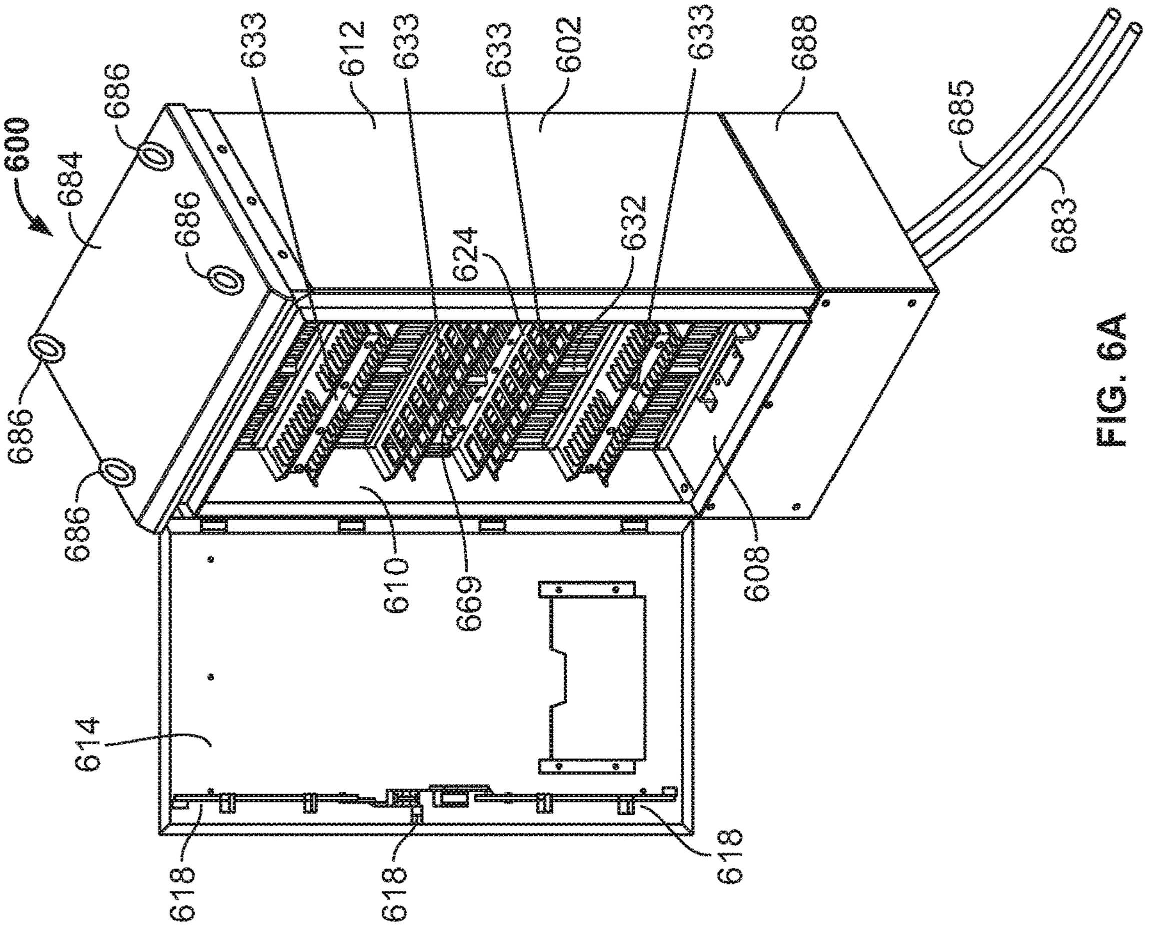
Figure 7:
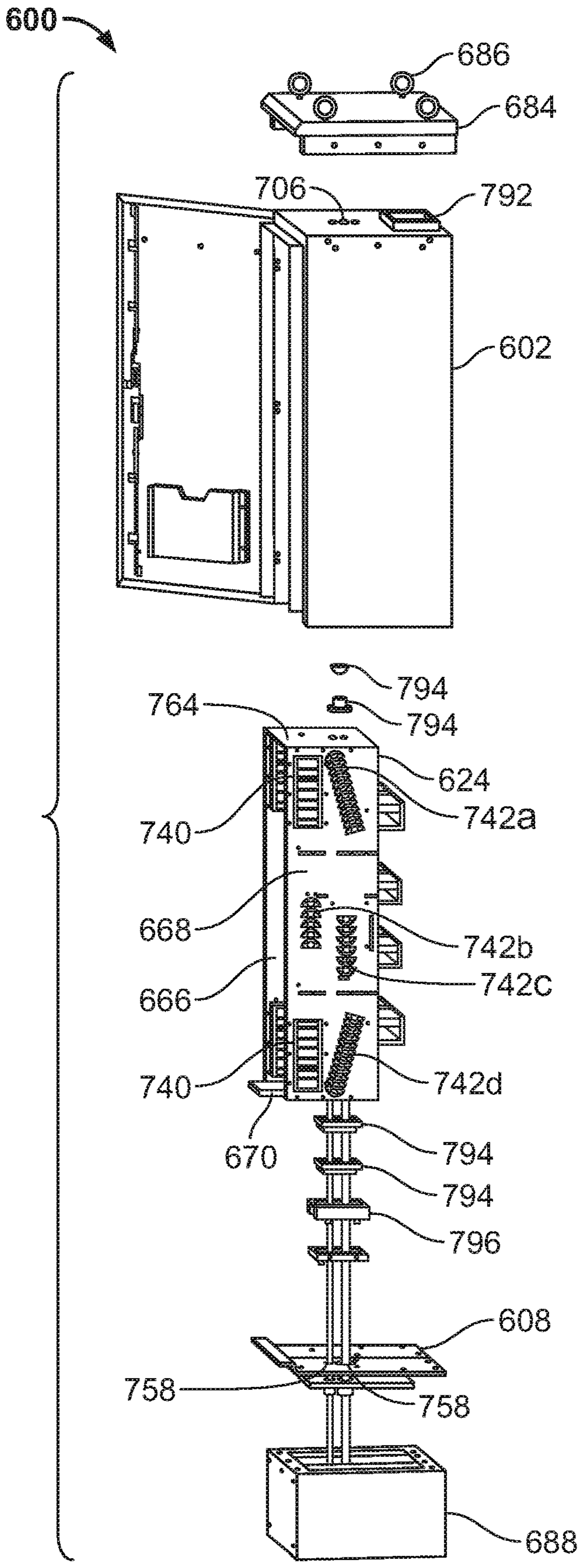
FIG. 7 is an exploded view of the fiber distribution hub shown in FIGS. 6A and 6B.

FIGS. 6A and 6B are perspective views of FDH 600 with frame body 624 in a first position and the frame body in a second position, respectively, and FIG. 7 is an exploded view of FDH 600. FDH 600 includes an enclosure 602 and a frame body 624. Enclosure 602 defines an interior region. As shown in FIGS. 6 and 7, enclosure 602 can include a first panel (not shown, but can be similar to panel 104 of FDH 100), a pair of opposing panels 706 and 608 extending from the first panel, and a second pair of opposing panels 610 and 612 that extends from the first panel. Panel 610 is between the first pair of opposing panels 706 and 608, and panel 612 is between the first pair of opposing panels 706 and 608. Collectively, panels 706, 608, 610, and 612 can define an opening to the interior region of enclosure 602.

Enclosure 602 can also include panel 614. Panel 614 can be configured to be selectively movable between a first position that closes the interior region opening to a second position that provides access to the interior region of enclosure 602 (as shown in FIGS. 6A and 6B). Panel 614 can be movably coupled to enclosure 602 by one or more hinges. Enclosure 602 can provide environmental and external force protection for any components housed within the interior region. Enclosure 602 can form a substantially rectangular prism. In other embodiments, enclosure 602 can form any other suitable shape.

Panel 614 can have one or more locking mechanisms that prevent panel 614 from moving away from the first position that closes the interior region opening and prevents access to the interior region defined by enclosure 602. For example, as shown in FIGS. 6A and 6B, the locking mechanism can be a three-point locking mechanism 618.

FDH 600 is optically coupled to one or more feeder cables 685 and to one or more distribution cables 683. Accordingly, panel 608 can define one or more openings 758 for passing one or more fiber optic cables as shown in FIG. 7.

Panel 608 of enclosure 602 can be configured to be fixedly or selectively coupled to a pedestal base 688. Pedestal base 688 elevates panel 608 to a height that allows one or more feeder cables 685 and one or more distribution cables 683 to easily pass through openings 758 defined by panel 608. Pedestal base 688 is configured to be mounted to any suitable mounting surface, for example, the ground or the floor.

As shown in FIGS. 6A, 6B, and 7, FDH 600 can also include a canopy 684 that is coupled to panel 706 of enclosure 602. Canopy 684 can be configured for attachment to a lifting device such as a crane or boom such that FDH 600 can be easily moved and installed at a desired location. For example, canopy 684 can have one or more lifting hooks 686. Lifting hooks 686 can form complete loops as shown in FIGS. 6A, 6B, and 7, or only partial loops (not shown). A cable, rope, chain, or strap attached to the lifting device can be coupled to lifting hooks 686 to move FDH 600.

As shown in FIG. 7, panel 706 of enclosure 602 can define one or more ventilation openings 792. Ventilation openings 792 allow air to pass from the surrounding atmosphere into the interior region of enclosure 602. Canopy 684 can be configured to overlay ventilation opening 792 to prevent liquid from entering the interior region of enclosure 602 while also allowing ventilation.

Frame body 624 is rotatably coupled to enclosure 602. Frame body 624 has a longitudinal axis LA (shown in FIG. 8) about which frame body 624 can rotate. Longitudinal axis LA can be perpendicular to panel 608 and to a mounting surface, for example, the ground or floor, upon which FDH 600 is mounted. Frame body 624 can be configured to rotate about longitudinal axis LA in both directions. Frame body 624 can be coupled to enclosure 602 using a pair of opposing bearing mounts similar to bearing mounts 126 and 128 described above with reference to FDH 100 shown in FIGS. 1-5. As seen in FIG. 7, the bearing mounts can include one or more bushings 794 that form bearing surfaces therebetween. FDH 600 can also include a bushing holder 796 that is configured to couple bushings 794 of the lower bearing mount to panel 608 to which holder 796 is attached.

Figure 8:
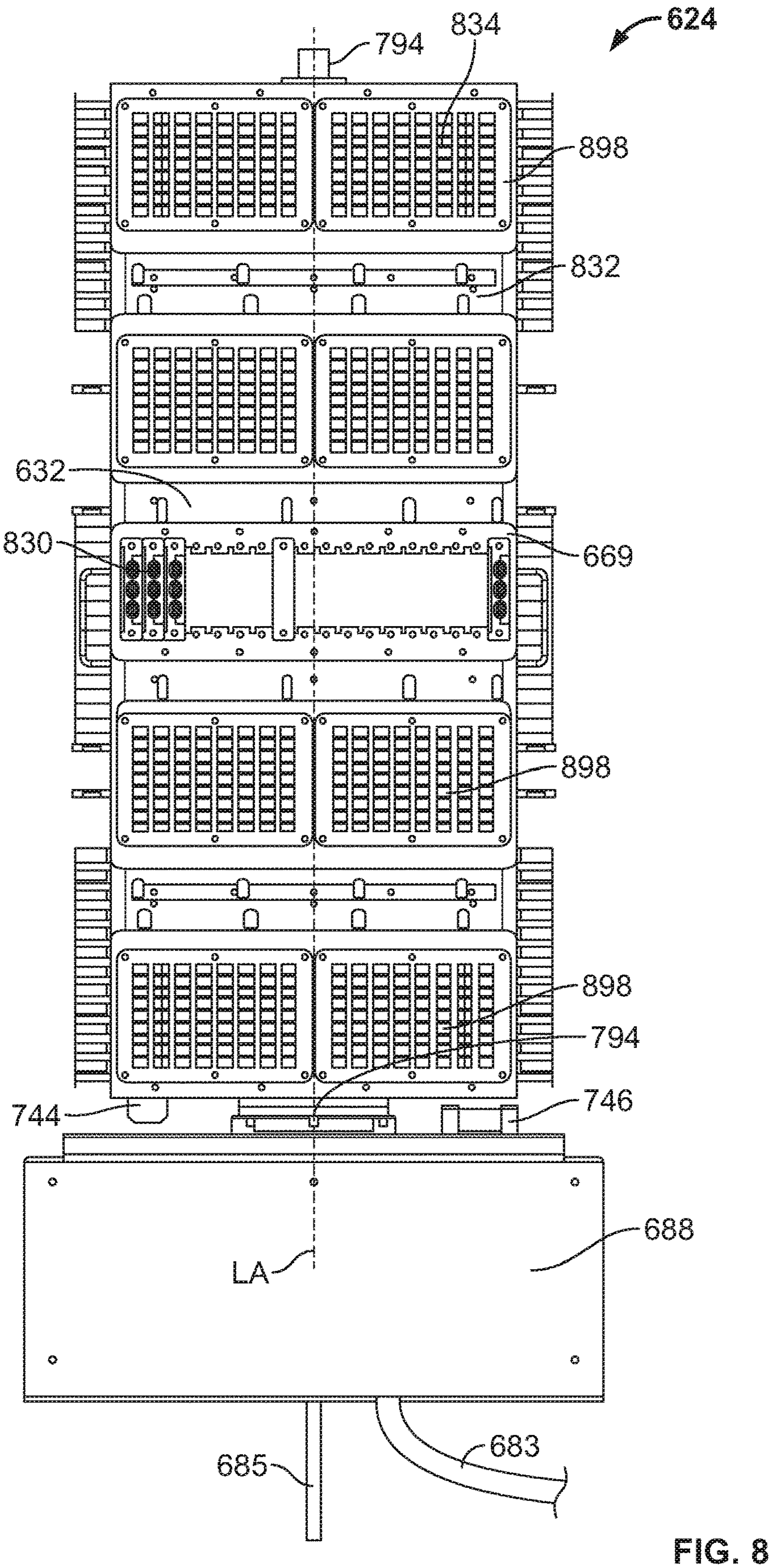
FIG. 8 is a plan view of the fiber distribution hub shown in FIGS. 6A and 6B with a portion of the enclosure removed.
Figure 9C:
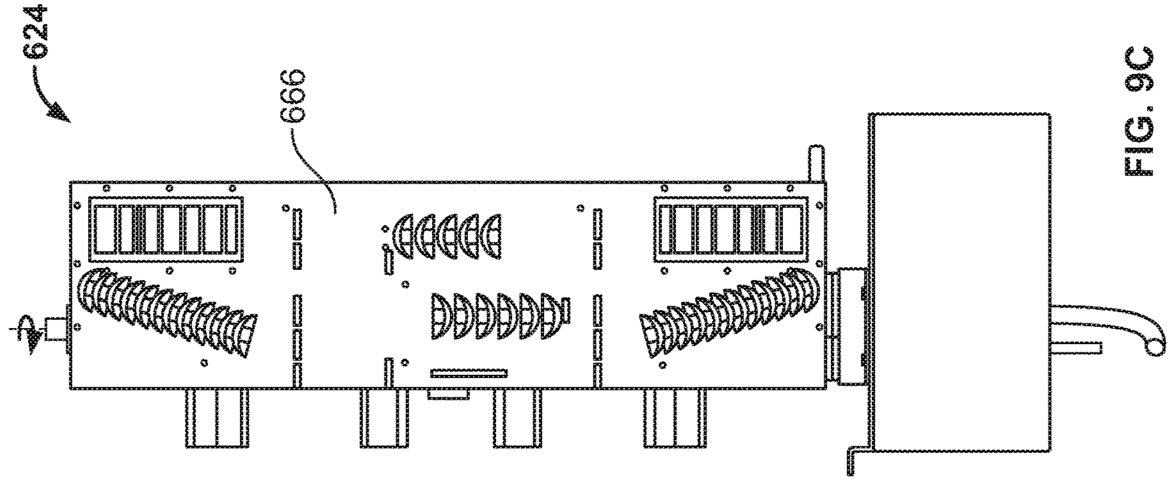
FIGS. 9A, 9B, and 9C are side, front, and side views, respectively, of the fiber distribution hub shown in FIGS. 6A and 6B.
Figure 9B:
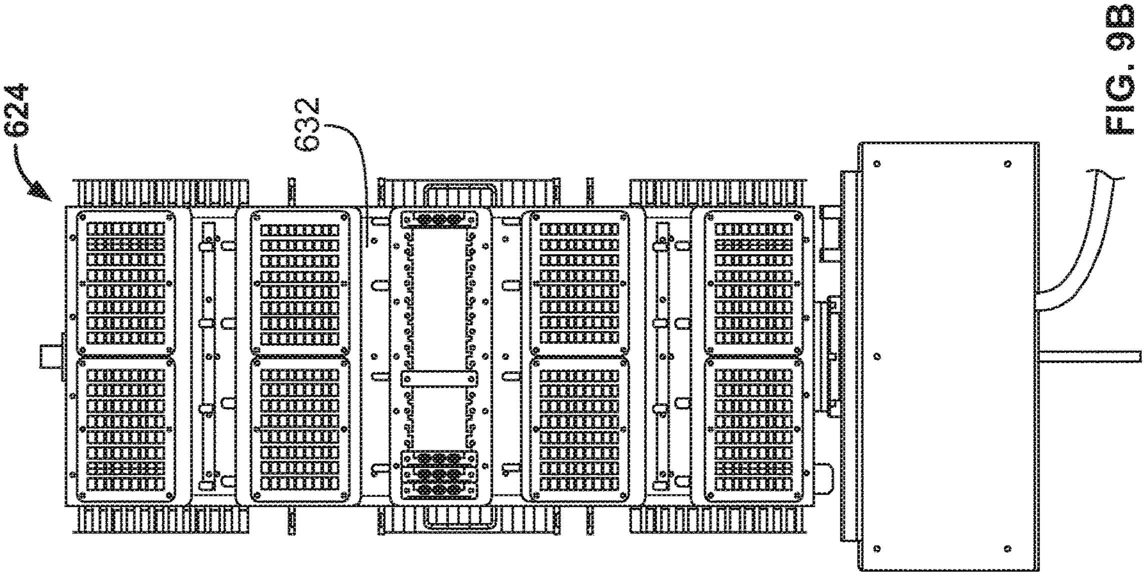
Figure 9A:
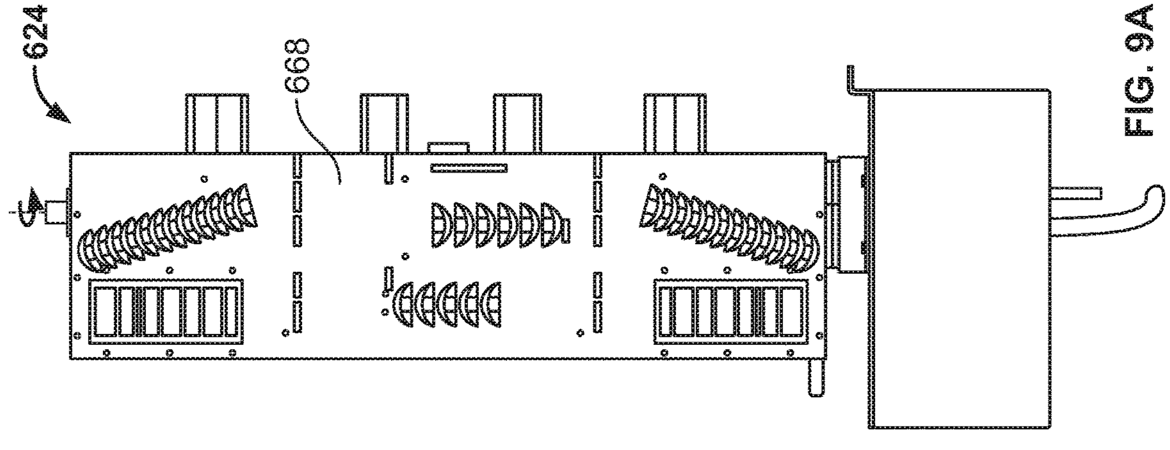
Figure 10:
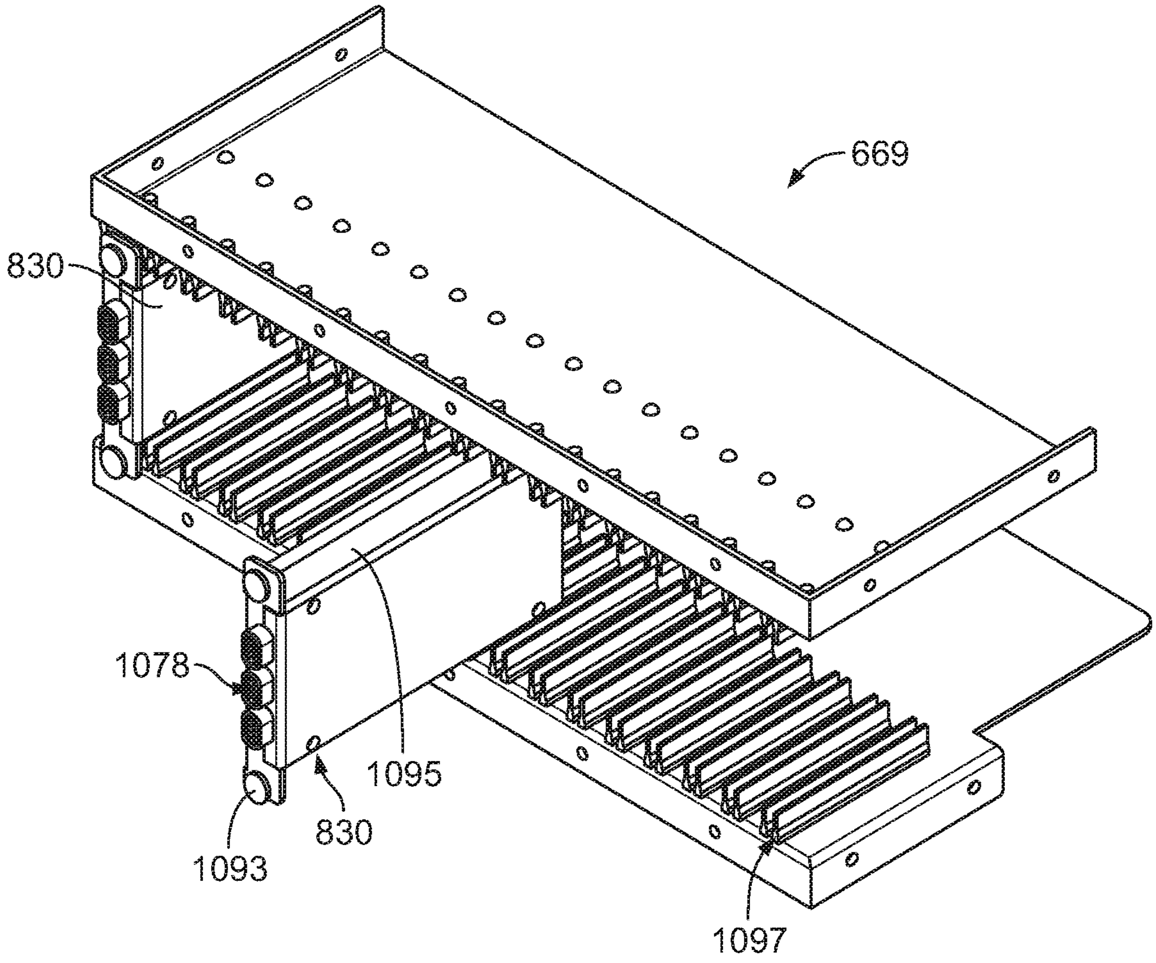
FIG. 10 is a perspective view of a splitter mounting rack for use with the fiber distribution hub shown in FIGS. 6A and 6B.

Frame body 624 can be configured to house one or more optical splitters 830. As shown in FIGS. 6A, 8, and 9B, frame body 624 includes an adapter/splitter panel 632 that defines an opening for receiving a splitter shelf 669. One or more splitters 830 can selectively couple to splitter shelf 669. For example, as shown in FIG. 10, splitter shelf 669 can define a plurality of channels 1097 configured to slidably receive flanges 1095 on each splitter 830. Each splitter 830 can have one or more locking mechanisms, for example, nylatches or any other suitable locking mechanism, for selectively coupling splitter 830 to splitter shelf 669. Each splitter 830 can have multiple outputs 1078. In one embodiment, the splitter shelf 669 is located at about the mid-point of the height of adapter/splitter panel 632. An input of splitter 830 can be positioned at an end opposite outputs 1078 or at the same end as outputs 1078.

One or more multi-fiber feeder cables 685 enter enclosure 602 through one or more openings 758. Each multi-fiber feeder cable 685 can include, for example, 12, 24, 48, 72, or any other suitable quantity of fibers. Each feeder cable 685 is then split into single-fiber feeder cables and routed to optical splitters 830 (via splicing cassettes as described above with reference to FDH 100). In some embodiments, splitters 830 can have a 1 input×32 output configuration, a 1 input×16 output configuration, or any other suitable splitter configuration.

Figure 11:
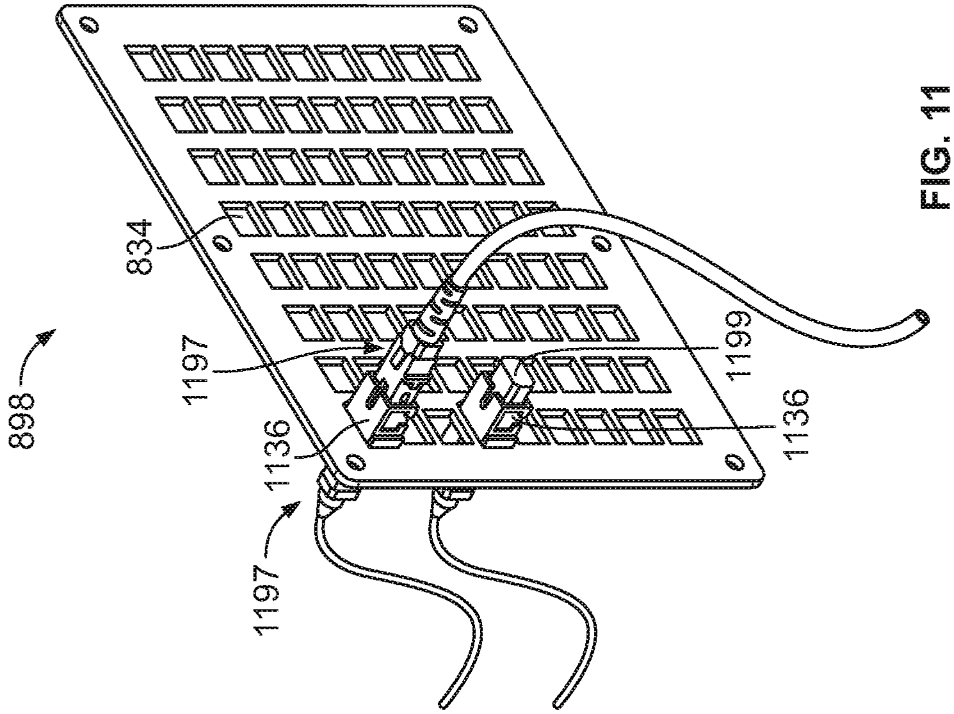
FIG. 11 is a perspective view of an adapter panel for use with the fiber distribution hub shown in FIGS. 6A and 6B.

Adapter/splitter panel 632 of frame body 624 can also be configured to couple to a plurality of adapter plates 898. As shown in FIG. 11, adapter plates 898 are either fixedly or selectively coupled to adapter/splitter panel 632. Each adapter plate 898 defines a plurality of openings 834. Openings 834 are sized to securely receive a plurality of adapters 1136 that optically couple splitter output cables from splitters 830 to connectorized ends of one or more distribution cables 683. Ends of adapters 1136 that are not coupled to splitter output cables can be coupled to a dust cap 1199 to prevent contaminants and dirt from interfering with any future connections.

Frame body 624 can also include one or more cable management trays 633. Cable management trays 633 can be coupled to adapter/splitter panel 632. Cable management trays 633 can be configured to efficiently route fiber optic cables to and from splitters 830 and to efficiently route fiber optic cables to and from adapters 1136. As shown in FIG. 6A, a cable management tray 633 can be positioned between each row of adapter panels 898 and between adapter panels 898 and splitter shelf 669.

As shown in FIG. 8, frame body 624 includes four adapter plates 834 above splitter shelf 669, and four adapter plates below splitter shelf 669. In other embodiments, frame body 624 can include more or less than eight total adapter plates 898.

Frame body 624 can also include side panels 666 and 668. Side panels 668 and 666 extend from adapter/splitter panel 632. Frame body 624 can also include first end panel 764 and second end panel 670. Frame body 624 can form a substantially rectangular prism. In other embodiments, frame body 624 can form any other suitable shape. Each side panel 666 and 668 can have one or more cable routing guides. For example, each side panel 666 and 668 can include a first series of cable routing guides 742*a*, a second series of cable routing guides 742*b*, a third series of routing guides 742*c*, and a fourth series of cable routing guides 742*d*.

Figure 12:
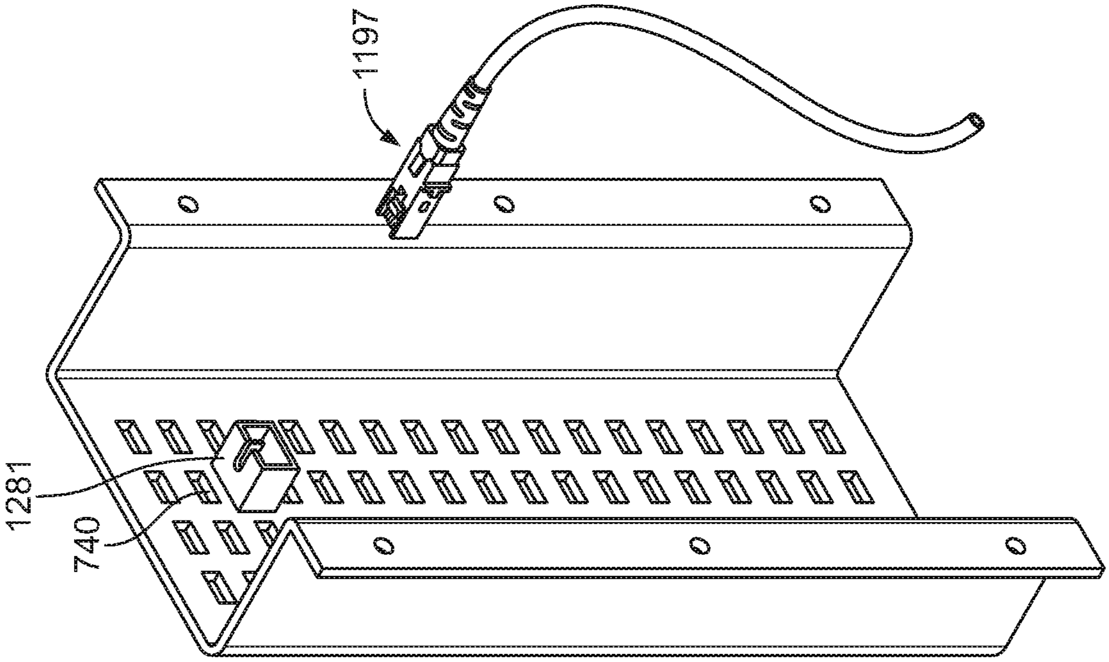
FIG. 12 a perspective view of a storage retaining structure for use with the fiber distribution hub of FIGS. 6A and 6B.

Each side panel 666 and 668 can have one or more storage retaining structures 740. For example, each side panel 666 and 668 can have one cable retaining structure 740 above splice shelf 669 and one cable retaining structures 740 below splice shelf 669. Each cable retaining structure 740 is configured to selectively couple to the ends of splitter output cables that are not being used are not coupled with adapters 1136 on adapter panels 898. As shown in FIG. 12, retaining structure 740 can define a plurality of openings configured to securely receive adapters 1281 for coupling to the connectorized ends of the splitter output cables. In other embodiments, storage retaining structures 740 can include clips or any other suitable retaining mechanisms that can selectively couple to the unused splitter output cables.

Frame body 624 can be configured to rotate in a first direction from a first position as shown in FIG. 6A to a second position at which frame body 624 cannot rotate any further in the first direction as shown in FIG. 6B. Frame body 624 can further be configured to rotate in a second direction, opposite of the first direction, from the first position as shown in FIG. 6A to a third position at which frame body 624 cannot rotate any further in the second direction (which looks substantially similar to the second position shown in FIG. 6B in one embodiment), FDH 600 can include a pair of corresponding tabs on enclosure 602 and frame body 624 that contact each at the second position and at the third position to prevent further rotation. For example, as shown in FIG. 8, frame body 624 can include a tab 744 that extends from a surface of frame body 624, and enclosure 602 can include a tab 746 that extends from an inner surface of panel 608 of enclosure 602. Tabs 744 and 746 are positioned such that when frame body 624 is at the second position, tab 744 contacts tab 746 to prevent any further rotation in the first direction. Tabs 744 and 746 are positioned such that when frame body 624 is at the third position, tab 744 contacts tab 746 to prevent any further rotation in the second direction. Optical components of FDH 600 can remain optically coupled to distribution cable 683 and feeder cable 685 during rotation.

In one embodiment, the second position and the third position are about 360 degrees apart. In other embodiments, the second position and the third position are less than about 360 degrees apart, for example, 270 degrees, 180 degrees, or any other suitable amount.

As shown in FIG. 6B, frame body 624 can include second end panel 670 that extends from adapter/splitter panel 632. Panel 670 can be perpendicular to adapter/splitter panel 632 and side panels 666 and 668. End panel 670 can be configured to house one or more splicing cassettes that are configured to optically couple fibers of one or more distribution cables 683 with single-fiber splitter input cables of splitters 830. For example, a splice cassette tray 680 can be coupled to an inner surface of end panel 670. Splice cassette tray 680 can be shaped to closely receive the one or more splicing cassettes. Accordingly, when frame body 624 rotates, splicing cassettes mounted on end panel 670 rotate in unison with frame body 624. A single-fiber splitter input cable is optically coupled to an input of splitters 830, and a plurality of single-fiber splitter output cables are optically coupled to the splitter output cables. Each splitter input cable is routed from the splice cassette mounted on end panel 670 to a respective splitter input of the optical splitter 830. Each splitter output cable is routed from the respective output of the optical splitter 830 to either adapters 1136 or storage retaining structure 740.

Accordingly, FDH 600 can provide access to end panel 670 and any components mounted thereon (for example, one or more splicing cassettes), inputs of splitters 830, outputs of optical splitters 830, adapters 1136, and storage retaining structures 740 through selective rotation of frame body 624. Accordingly, rotation of frame body 624 can provide easy access to any component of FDH 600 and allow for repair or replacement. In some embodiments, frame body 624 can rotate about longitudinal axis LA about 180 degrees in one direction and about 180 degrees in the other direction from the first position. In other embodiments, frame body 624 can rotate more or less than 180 degrees in either direction.

In some embodiments, the first panel (not shown, hut can be similar to panel 104 of FDH 100) and panels 610, 612, and 706 of enclosure 602 can be configured to be selectively coupled to panel 608, which can be coupled to pedestal base 688. Accordingly, the first panel and panels 610, 612, and 706 can be removed from panel 608 to provide 360 degree access to frame body 624 and the optical components mounted thereon similar to the view illustrated in FIG. 7. Such access can be desirable for repairing or replacing optical components. The first panel and panels 610, 612, and 706 can be recoupled to panel 608 after the repair or replacement.

In other embodiments, the first panel and panels 610, 612, and 706 can be omitted altogether. In effect, FDH 600 can be enclosure-less. In such embodiments, frame body 624 is rotatably coupled to panel 608 and pedestal base 688. This configuration can be used in high fiber density applications, for example, data centers. In such high fiber density applications, a plurality of FDHs 600, each without the first panel and panels 610, 612, and 706, can be used. The plurality of FDHs 600 can be arranged such that bushings 794 coupled to panels 764 of FDHs 600 are aligned. An elongated channel or support can be rotatably coupled to bushings 794 on panels 764 of each FDH 600 to provide an additional point of support. The elongated channel or support can be configured to run fiber optic cables between each FDH 600.

Although the present embodiments have been described with reference to specific example embodiments, it will be evident that various modifications may be made to these embodiments without departing from the broader spirit and scope of the various embodiments. Accordingly, the specification and the drawings are regarded in an illustrative rather than a restrictive sense.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A fiber distribution hub comprising:

an enclosure;

a frame mounted within an interior of the enclosure that is configured to rotate relative to the enclosure about a longitudinal axis between a first position and a second position;

wherein the enclosure includes a first engagement feature, and the frame includes a second engagement feature;

wherein the first engagement feature and the second engagement feature are configured to limit a range of rotation of the frame between the first position and the second position;

wherein the entire frame remains within the interior region as the frame rotates between the first position and the second position; and wherein the frame is configured to rotate relative to the enclosure when an optical component mounted to the frame is coupled with a distribution cable and a feeder cable.

2. The fiber distribution hub of claim 1, further comprising a cable management structure that is configured to route fiber optic cables to and around the frame such that the fiber optic cables are configured to rotate in unison with the frame.

3. The fiber distribution hub of claim 1, wherein the optical component comprises a splitter that is configured to be coupled with the frame and includes a splitter input and a splitter output.

4. The fiber distribution hub of claim 3, further comprising:

an adapter that is configured to be coupled to the frame and to optically couple the splitter output to a fiber optic cable; and a storage retaining structure configured to be coupled to the frame and to selectively secure a connectorized end of the splitter output.

5. The fiber distribution hub of claim 1, wherein the first engagement feature comprises a first tab and the second engagement feature comprises a second tab; and wherein the first tab and the second tab are configured such that the first tab contacts the second tab at the first position and at the second position, and the contact between the first tab and the second tab is configured to substantially prevent rotation beyond the first position and the second position.

6. The fiber distribution hub of claim 1, wherein an angle of rotation between the first position and the second position is about 360 degrees.

7. The fiber distribution hub of claim 1, wherein an angle of rotation between the first position and the second position is about 180 degrees or greater.

8. The fiber distribution hub of claim 1, wherein the enclosure is substantially rectangular.

9. The fiber distribution hub of claim 1, further comprising a pedestal base configured to be coupled with the enclosure.

10. The fiber distribution hub of claim 1, wherein the enclosure comprises first, second, third, and fourth panels configured to define the interior region;

wherein the frame is configured to be rotatingly mounted to the fourth panel; and wherein the first, second, and third panels are configured to be selectively coupled to the fourth panel such that the first, second, and third panels can be selectively removed from the fiber distribution hub.

11. A fiber distribution hub comprising:

an enclosure;

a frame mounted within an interior of the enclosure such that the frame is configured to rotate about a longitudinal axis between a first position and a second position;

wherein the longitudinal axis is offset from a lateral edge of the frame;

wherein the enclosure includes a first engagement feature, and the frame includes a second engagement feature;

wherein the first engagement feature and the second engagement feature are configured to limit a range of rotation of the frame between the first position and the second position; and wherein the frame is configured to rotate relative to the enclosure when an optical component mounted to the frame is coupled with a distribution cable and a feeder cable.

12. The fiber distribution hub of claim 11, wherein the entire frame remains within the interior region as the frame rotates between the first position and the second position.

13. The fiber distribution hub of claim 11, further comprising a cable management structure that is configured to route fiber optic cables to and around the frame such that the fiber optic cables are configured to rotate in unison with frame.

14. The fiber distribution hub of claim 11, wherein the optical component comprises a splitter that is configured to be coupled with the frame and includes a splitter input and a splitter output.

15. The fiber distribution hub of claim 14, further comprising:

an adapter that is configured to be coupled to the frame and to optically couple the splitter output to a fiber optic cable; and a storage retaining structure configured to be coupled to the frame and to selectively secure a connectorized end of the splitter output.

16. The fiber distribution hub of claim 11, wherein the first engagement feature comprises a first tab and the second engagement feature comprises a second tab; and wherein the first tab and the second tab are configured such that the first tab contacts the second tab at the first position and at the second position, and the contact between the first tab and the second tab is configured to substantially prevent rotation beyond the first position and the second position.

17. The fiber distribution hub of claim 11, wherein an angle of rotation between the first position and the second position is about 360 degrees.

18. The fiber distribution hub of claim 11, wherein an angle of rotation between the first position and the second position is about 180 degrees or greater.

19. The fiber distribution hub of claim 11, wherein the enclosure is substantially rectangular.

20. The fiber distribution hub of claim 11, further comprising a pedestal base configured to be coupled with the enclosure.

21. The fiber distribution hub of claim 11, wherein the enclosure comprises first, second, third, and fourth panels configured to define the interior region;

wherein the frame is configured to be rotatingly mounted to the fourth panel; and wherein the first, second, and third panels are configured to be selectively coupled to the fourth panel such that the first, second, and third panels can be selectively removed from the fiber distribution hub.

22. A fiber distribution hub comprising:

an enclosure;

a frame mounted within an interior of the enclosure such that the frame is configured to rotate about a longitudinal axis between a first position and a second position;

wherein the longitudinal axis is offset from a lateral edge of the frame;

wherein the enclosure includes a first engagement feature, and the frame includes a second engagement feature;

wherein the first engagement feature and the second engagement feature are configured to limit a range of rotation of the frame between the first position and the second position; and wherein a fiber management structure is configured to route fiber optic cables to and around the frame such that the fiber optic cables are configured to rotate in unison with frame.

23. The fiber distribution hub of claim 22, wherein the entire frame is configured to remain within the interior region as the frame rotates between the first position and the second position.

24. The fiber distribution hub of claim 22, wherein the frame is configured to rotate relative to the enclosure when an optical component mounted to the frame is coupled with a distribution cable and a feeder cable.

25. The fiber distribution hub of claim 22, wherein the optical component comprises a splitter that is configured to be coupled to the frame and includes a splitter input and a splitter output.

26. The fiber distribution hub of claim 25, further comprising:

an adapter that is configured to be coupled to the frame and to optically couple the splitter output to a fiber optic cable; and a storage retaining structure configured to be coupled to the frame and to selectively secure a connectorized end of the splitter output.

27. The fiber distribution hub of claim 22, wherein the first engagement feature comprises a first tab and the second engagement feature comprises a second tab; and wherein the first tab and the second tab are configured such that the first tab contacts the second tab at the first position and at the second position, and the contact between the first tab and the second tab is configured to substantially prevent rotation beyond the first position and the second position.

28. The fiber distribution hub of claim 22, wherein an angle of rotation between the first position and the second position is about 360 degrees.

29. The fiber distribution hub of claim 22, wherein an angle of rotation between the first position and the second position is about 180 degrees or greater.

30. The fiber distribution hub of claim 22, wherein the enclosure is substantially rectangular.

31. The fiber distribution hub of claim 22, further comprising a pedestal base configured to be coupled with the enclosure.

32. The fiber distribution hub of claim 22, wherein the enclosure comprises first, second, third, and fourth panels configured to define the interior region;

wherein the frame is configured to be rotatingly mounted to the fourth panel; and wherein the first, second, and third panels are configured to be selectively coupled to the fourth panel such that the first, second, and third panels can be selectively removed from the fiber distribution hub.

* * * * *